Jan. 21, 1958 J. A. JANNENGA ET AL 2,820,376
BORING MACHINE
Filed July 1, 1954 3 Sheets-Sheet 1

INVENTOR
Joel A. Jannenga
Donald E. Hawkinson
By Carlsen, Pitzner, Hubbard & Wolfe
ATTORNEYS

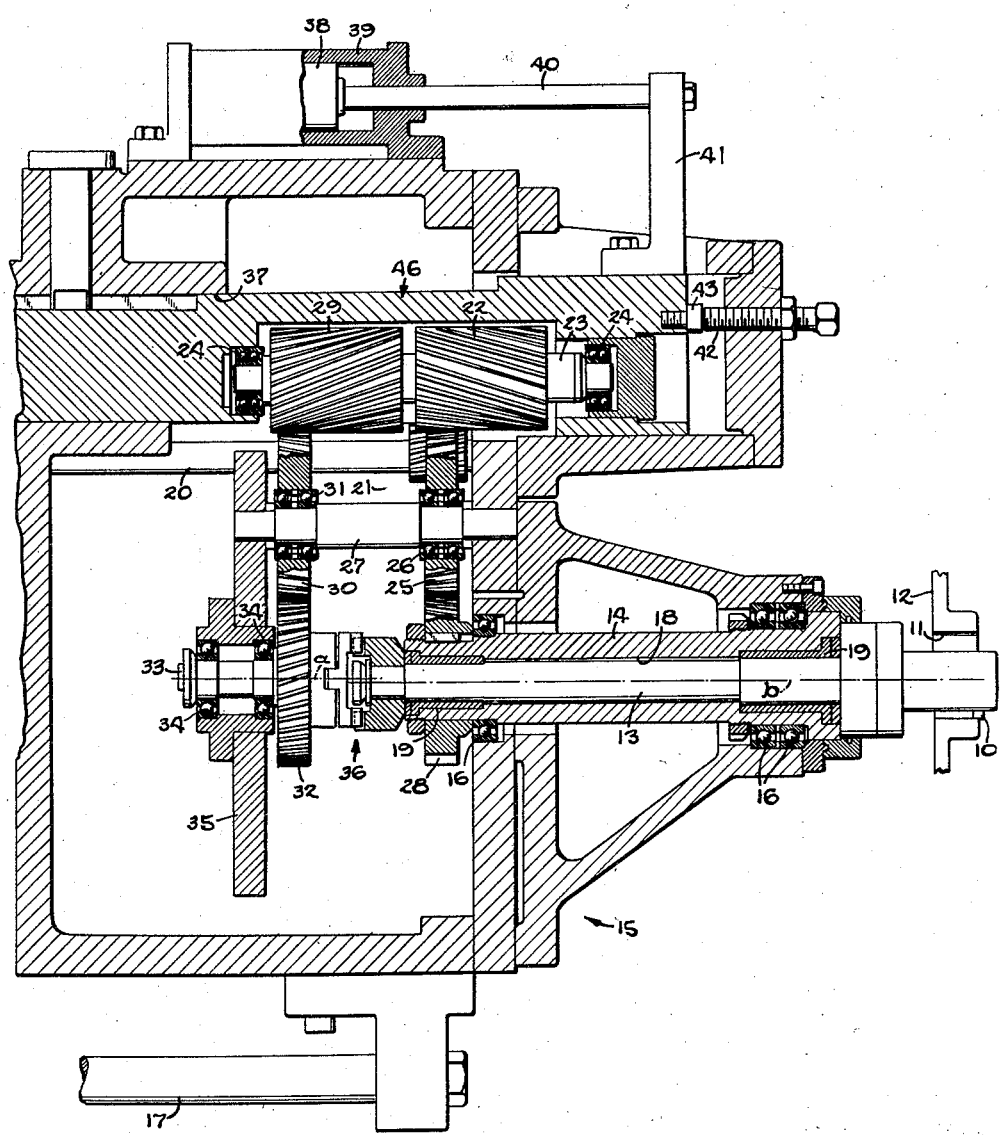

Jan. 21, 1958    J. A. JANNENGA ET AL    2,820,376
BORING MACHINE
Filed July 1, 1954    3 Sheets-Sheet 3
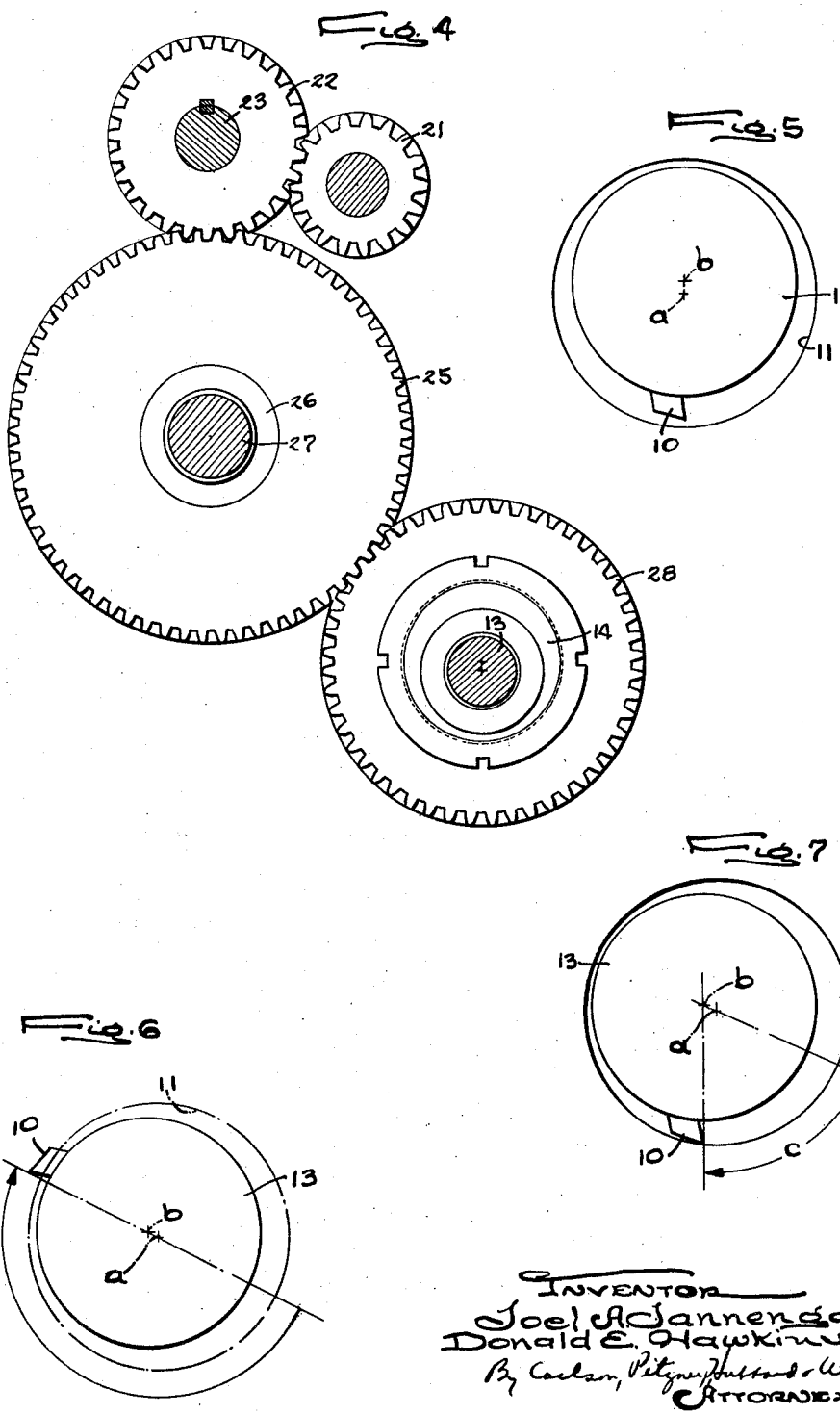

United States Patent Office 2,820,376
Patented Jan. 21, 1958

2,820,376

BORING MACHINE

Joel A. Jannenga and Donald E. Hawkinson, Rockford, Ill., assignors to Greenlee Bros. & Co., Rockford, Ill., a corporation of Illinois Application July 1, 1954, Serial No. 440,752

14 Claims. (Cl. 77—3)

This invention relates to a boring machine and, more particularly to a machine of the type in which the tool is mounted on a spindle eccentrically journaled in a rotatable sleeve so that the spindle and the sleeve turn about spaced parallel axes. In such a machine, the tool turns about the axis of the sleeve when the sleeve and the spindle turn together at the same speed. By turning the spindle relative to the sleeve, the tool is moved radially in or out due to the eccentric relation of the spindle and the sleeve and, the depth of cut is set or the tool is retracted away from the work.

The general object is to provide a novel boring machine of the above character in which the relative angular positions of the sleeve and the spindle may be changed while the machine is running so that the depth of cut may be set or the tool retracted from the work without stopping the machine.

A more detailed object is to interpose in the drive for the spindle or the sleeve or in both drives a pair of helical gears which are axially shiftable relative to each other to produce a cam action for retarding or speeding up the spindle or the sleeve thereby displacing one angularly relative to the other.

Other objects and advantages of the invention will become apparent from the following detailed description taken in connection with the accompanying drawings, in which Figure 1 is a longitudinal fragmentary sectional view of a boring machine embodying the novel features of the present invention.

Fig. 3 is a view similar to Fig. 1 but shows the parts in a moved position.

Fig. 4 is a sectional view taken along the line 4—4 in Fig. 1.

Figs. 5, 6 and 7 are views similar to Fig. 2 but show the parts in different positions.

Figures 1, 2:
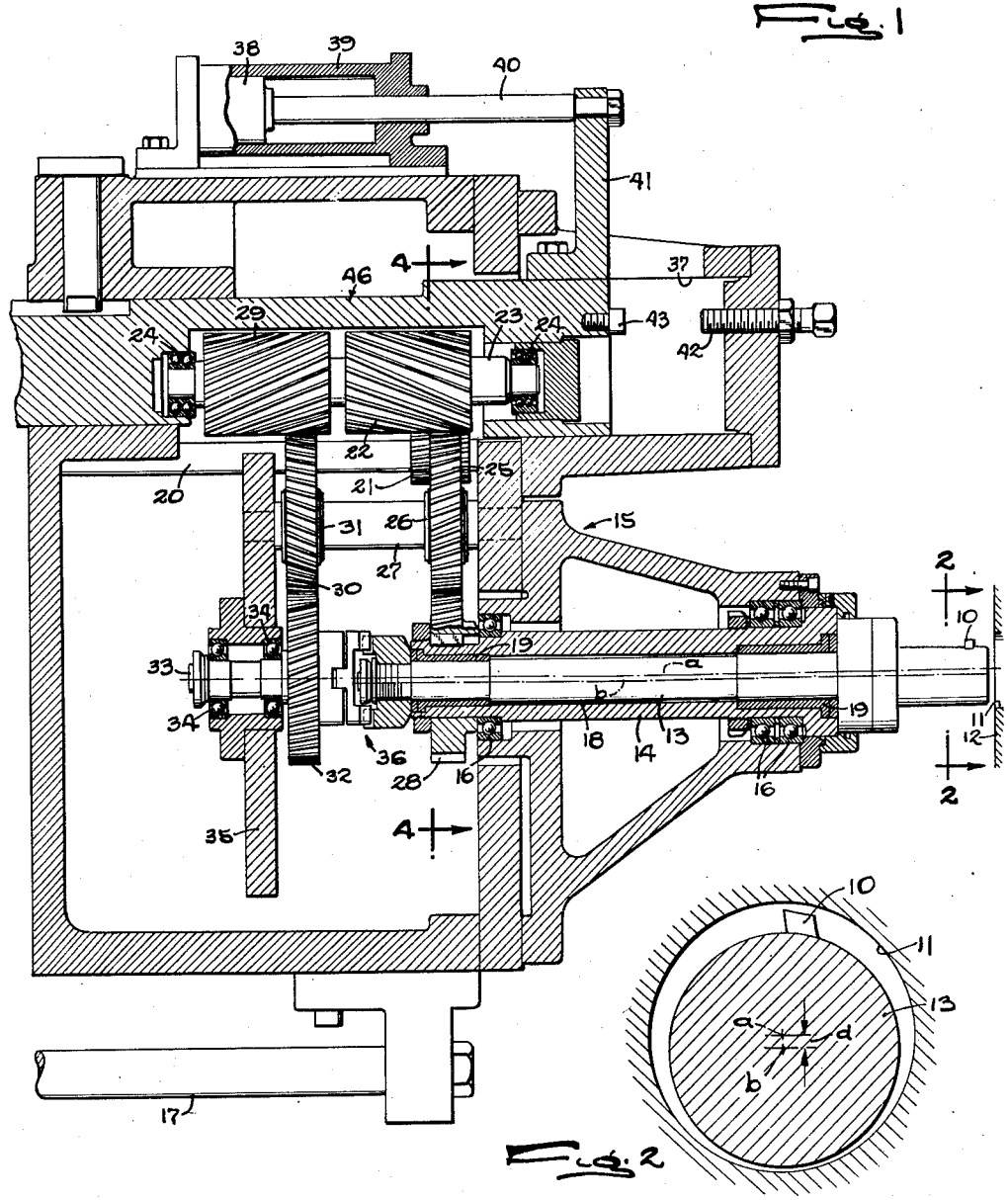
Fig. 2 is a sectional view taken along the line 2—2 in Fig. 1.

For purposes of illustration, the invention is shown in the drawings embodied in a boring machine having a single point cutting tool 10 for machining the wall of the bore 11 of a workpiece 12. The tool is mounted to turn about the axis $a$ of the bore and, to this end, is supported on the outer end of an elongated spindle 13. The latter is received within a sleeve 14 which is journaled on a head 15 in spaced bearings 16 and is coaxial with the bore 11 so that, when the sleeve and the spindle are turned together, the tool turns about the axis $a$. A suitable power actuator (not shown) connected to the head 15 through a rod 17 shifts the head and hence the spindle axially to advance the tool into the workpiece.

To project the tool 10 laterally different distances from the axis $a$ and thereby adjust the depth of the cut made by the tool, the spindle 13 is supported to turn relative to the sleeve 14 about an axis $b$ which is parallel to but offset from the axis $a$ a distance $d$ (Fig. 2) whereby such relative turning moves the cutting edge of the tool toward or away from the axis of rotation. For this purpose, the sleeve is formed with an eccentric bore 18 which is coaxial with the axis $b$ and the spindle is journaled in the sleeve bore in spaced bushings 19 to turn relative to the sleeve about this axis. Thus, when the spindle turns about the axis $b$ at the same rate as the sleeve turns about the axis $a$, the radial position of the tool remains the same as will be seen from a comparison of Figs. 2 and 5. When, however, the spindle is turned relative to the sleeve in a counterclockwise direction as viewed in Fig. 2, the tool is fed into the wall of the workpiece bore 11. For example, turning the spindle through the angle $c$ (Fig. 7) moves the cutting edge of the tool from a position spaced from the bore wall to a position against the wall. Continued turning feeds the tool into the wall until the maximum depth of cut has been reached by turning the spindle through 180 degrees (see Fig. 6). Similarly, relative turning of the spindle and the sleeve in the opposite direction retracts the tool from the bore wall.

Herein, the spindle 13 and the sleeve 14 are turned about their respective axes by a common drive shaft 20 which is journaled in the head 15 and is driven by a suitable motor (not shown). A gear 21 fast on the shaft meshes with a gear 22 keyed to a shaft 23 which is journaled in spaced bearings 24. The gear 22 also meshes with an idler gear 25 journaled by means of a bearing 26 (Fig. 3) on a stationary shaft 27 and the idler gear, in turn, meshes with a gear 28 encircling the sleeve 14 thus completing the drive train between the shaft 20 and the sleeve. Similarly, the train for the spindle 13 comprises a second gear 29 fast on the shaft 23, a gear 30 journaled by a bearing 31 on the shaft 27 and a gear 32 keyed to a stub shaft 33. The latter is journaled in bearings 34 on a partition 35 of the head 15 and is connected to the spindle through an Oldham coupling 36. The gears 22 and 29 are the same size as are the idler gears 25 and 30 and the gears 28 and 32 so that, normally, the sleeve and the spindle are turned at the same angular speed.

The present invention contemplates the provision of a novel mechanism for turning the sleeve 14 and the spindle 13 selectively at different angular speeds so that the relative angular positions of the two are changed thus moving the tool 10 toward or away from the wall of the work bore 11. The arrangement is such that the tool may be shifted while the sleeve and spindle are turning and, as a result, the tool may be fed radially toward or backed off from the work without stopping the machine. This mechanism comprises one or more pairs of helical gears which are disposed in the drive train and are shiftable axially relative to each other. Due to the inclined teeth of these gears, such shifting produces a cam action which retards or speeds up either the sleeve or the spindle so that the two are turned relative to each other to change the position of the tool.

While the pair of shiftable gears may be in either the drive to the sleeve 14 or the drive to the spindle 13, it is preferred to employ two such pairs of gears, one in each of the drive trains. The two pairs operate in unison but in opposite directions so that one pair serves to retard the sleeve while the other speeds up the spindle and vice versa. In this way, the amount of relative turning of the spindle and the sleeve is doubled for a given amount of shifting of the gears. Herein, all the gears in both trains are formed with helical teeth and the gears 22 and 25 constitute the pair of shiftable gears in the drive to the sleeve while the gears 29 and 30 are the other pair in the drive to the spindle.

To shift the gears of each pair relative to each other, the shaft 23 supporting the gears 22 and 29 is mounted for selective endwise shifting, these gears being comparatively long to remain in mesh with the gears 25 and 30 during such shifting. The teeth of the gear 22 are inclined downwardly and to the right as viewed in Fig. 1 so that, when this gear is shifted to the right, it cams the gear 25 in a clockwise direction as viewed in Fig. 4 and hence the sleeve 14 is turned counterclockwise. In other words, as the sleeve is being turned by the drive shaft 20, shifting of the gear 22 increases the speed of the sleeve. The gear 29 acts in the same manner on the spindle through the gears 30 and 32 but the teeth of this gear are inclined upwardly and to the right. As a result, shifting of the gear 29 to the right produces a cam action which turns the spindle 13 clockwise (Fig. 4) thus decreasing the angular speed of the latter. Speeding up the sleeve and retarding the spindle cause the two to be displaced angularly relative to each other with the spindle turning relative to the sleeve in the direction of the arrow in Fig. 6. This moves the cutting edge of the tool out from the axis $a$ to the proper point for the desired depth of cut, the amount of such movement depending upon the distance the gears 22 and 29 are shifted.

When the gears 22 and 29 are shifted back to the left, the reverse result is obtained, that is, the sleeve 14 is retarded and the spindle 13 is speeded up. This causes the spindle to move back relative to the sleeve thus retracting the tool 10.

To support the gears 22 and 29 for endwise shifting, the bearings 24 are mounted on a carriage 46 which slides back and forth on the head 15 in a guideway 37. The carriage is moved along the guideway by a power actuator which herein is a piston 38 sliding in a cylinder 39. The latter is bolted to the top of the head and the end of the piston rod 40 is connected to the carriage by a bracket 41 bolted to both the rod and the carriage. Pressure fluid from a suitable source (not shown) is admitted selectively to the rod and head ends of the cylinder causing the carriage and hence the gears 22 and 29 to be shifted to the left or right respectively. The depth of feed of the tool is determined by an adjustable limit stop 42 which is threaded into the head for engagement with an abutment 43 on the carriage and which limits the sliding of the carriage in the feeding direction.

With the parts in the position shown in Fig. 1, the tool bit 10 is disposed outside of the workpiece 12 and is in the retracted position. With the drive shaft 20 running, the sleeve 14 is turned by the gears 21, 22, 25 and 28 and the spindle 13 is turned in unison with the sleeve through the gears 21 and 22, the shaft 23 and the gears 29, 30 and 32. Since the sleeve and the spindle are turning at the same speed about their respective axes, the tool 10 turns about the axis $a$. Next, operating fluid is admitted to the head end of the cylinder 39 moving the piston 38 and the carriage 36 to the right until the abutment 43 engages the stop 42 as shown in Fig. 3. This moves the gears 22 and 29 to the right and, as a result, the sleeve 14 is speeded up and the spindle 13 is retarded thus turning the spindle forward relative to the sleeve. Due to the eccentric mounting of the spindle in the sleeve, the tool 10 is projected out a distance determined by the position of the limit stop 42.

With the depth of cut set by shifting of the gears 22 and 29, the rod 17 is actuated to move the head 15 and advance the tool 10 through the bore 11. After the cut is completed, the pressure fluid is admitted to the rod end of the cylinder 39 to shift the gears to the left. This retards the spindle and speeds up the sleeve so that the spindle is turned clockwise relative to the sleeve and the tool is retracted away from the bore wall. The head 15 may then be moved to the left to withdraw the tool from the bore without the tool scratching the finished bore wall.

It will be observed that, with the present invention, the tool may be moved in and out while the spindle 13 and the sleeve 14 are being turned by the drive shaft 20. The endwise shifting of the gears 22 and 29, therefore, may be utilized not only for setting the depth of cut but also to feed the tool radially into the work in a counterboring operation. In such a case, the tool is moved into the bore in the retracted position and then the actuator 38 is energized to shift the gears 22 and 29. This feeds the tool radially into the wall of the bore to counterbore the latter.

We claim as our invention:

1. A machine tool comprising a base, a support journaled on said base to turn about a first predetermined axis, a member adapted to carry a cutting tool and mounted on said support to turn bodily therewith and to turn relative to the support about a second axis parallel to and spaced from said first axis, a first pair of helical gears mounted on said base in axial alinement and with their teeth inclined in opposite directions, a carriage supported by said base for movement relative thereto in a direction axially of said gears, a second pair of helical gears mounted on said carriage and meshing respectively with the gears of said first pair, drive means operable to turn the gears of said second pair, mechanism connecting the gears of said first pair with said support and said member respectively and normally operable to turn the support and the member at the same angular speed about their respective axes, and means for shifting said carriage to retard said support and speed up said member thereby to change the radial position of said tool.

2. A machine tool comprising a base, a support journaled on said base to turn about a first predetermined axis, a member mounted on said support to turn bodily therewith and to turn relative to the support about a second axis parallel to and spaced from said first axis, a cutting tool mounted on said member projecting laterally of said first and second parallel axes, a first pair of helical gears mounted on said base in axial alinement and with their teeth inclined in opposite directions, a carriage supported by said base for movement relative thereto in a direction axially of said gears, a second pair of helical gears mounted on said carriage and meshing respectively with the gears of said first pair, drive means operable to turn the gears of said second pair, mechanism connecting the gears of said first pair with said support and said member respectively and normally operable to turn the support, the member and the cutting tool at the same angular speed about their respective axes, and means for shifting said carriage to retard said support and speed up said member thereby to change the radial position of said cutting tool.

3. A machine tool comprising a base, a support journaled on said base to turn about a first predetermined axis, a member adapted to carry a tool and mounted on said support to turn bodily therewith and to turn relative to the support about a second axis parallel to and spaced from said first axis, a power actuated drive element, individual drive mechanisms respectively connecting said support and member to said drive element and normally operable to turn the support and the member at the same angular speeds about their respective axes, each of said mechanisms including a pair of meshing helical gears, a shaft supporting one gear of each of said pairs with the teeth of one gear inclined in one direction and the teeth of the other inclined in the opposite direction, and means for shifting said shaft endwise simultaneously to turn said support and said member relative to each other in opposite directions thereby to project the tool laterally different distances.

4. A machine tool comprising a base, a support mounted on said base to turn about a first predetermined axis, a member mounted on said support to turn bodily therewith and to turn relative to the support about a second axis parallel to and spaced from said first axis, a cutting tool mounted on said member projecting laterally of said first and second parallel axes, a power actuated drive element, individual drive mechanisms respectively connecting said support and member to said drive element externally of said support and of said member and normally operable to turn the support, the member and the cutting tool at the same angular speeds about their respective axes, each of said mechanisms including a pair of meshing helical gears, a shaft supporting one gear of each of said pairs with the teeth of one gear inclined in one direction and the teeth of the other inclined in the opposite direction, and means for shifting said shaft endwise simultaneously to turn said support and said member relative to each other in opposite directions thereby to project the cutting tool laterally different distances.

5. A machine tool comprising a base, a sleeve journaled on said base to turn about a first predetermined axis, a first drive mechanism operatively connected to said sleeve to turn the latter about said axis and including two meshing helical gears supported for relative axial shifting, a shaft disposed within said sleeve with one end projecting beyond the end of the sleeve and journaled on the sleeve to turn bodily therewith and to turn relative to the sleeve about a second axis parallel to but laterally spaced from said first axis, means on the projecting end of said shaft for supporting a laterally projecting cutting tool, a second drive mechanism operable to turn said shaft about said second axis in unison with said sleeve and similarly including two relatively shiftable helical gears, and means selectively operable to shift the gears of each of said drive mechanisms thereby to turn said sleeve in one direction relative to said shaft and turn the shaft in the opposite direction relative to the sleeve.

6. A machine tool comprising a base, a sleeve journaled on said base to turn about a first predetermined axis, a first drive mechanism operatively connected to said sleeve to turn the latter about said axis and including two meshing helical gears supported for relative axial shifting, a shaft disposed within said sleeve with one end projecting beyond the end of the sleeve and journaled on the sleeve to turn bodily therewith and to turn relative to the sleeve about a second axis parallel to but laterally offset from said first axis, a laterally projecting cutting tool mounted on the projecting end of said shaft, a second drive mechanism operable to turn said shaft and cutting tool about said second axis in unison with said sleeve and similarly including two relatively shiftable helical gears, said first and second drive mechanisms being positioned externally of said sleeve and shaft, and means selectively operable to shift the gears of each of said drive mechanisms thereby to turn said sleeve in one direction relative to said shaft and turn the shaft in the opposite direction relative to the sleeve thereby to project said cutting tool laterally different distances.

7. A machine tool comprising a base, a support mounted on said base to turn about a first predetermined axis, a drive mechanism operatively connected to said support to turn the support about said axis and including two helical gears meshing with each other and mounted for relative axial shifting, a member adapted to carry a laterally projecting cutting tool and mounted on said support to turn bodily therewith and to turn relative to the support about a second axis parallel to but laterally spaced from said first axis, a second drive mechanism operable to turn said member about said second axis in unison with said support and similarly including two relatively movable helical gears, and means for shifting one gear of each mechanism relative to the other to turn said support in one direction relative to said member and to turn the member in the opposite direction relative to the support thereby to shift said tool laterally.

8. A machine tool comprising a base, a support mounted on said base to turn about a first predetermined axis, a drive mechanism operatively connected to said support to turn the support about said axis and including two helical gears meshing with each other and mounted for relative axial shifting, a member mounted on said support to turn bodily therewith and to turn relative to the support about a second axis parallel to but laterally spaced from said first axis, a cutting tool mounted on said member projecting laterally of said first and second parallel axes, a second drive mechanism operable to turn said member and cutting tool about said second axis in unison with said support and similarly including two relatively movable helical gears, and means for shifting one gear of each mechanism relative to the other to turn said support in one direction relative to said member and to turn the member in the opposite direction relative to the support thereby to shift said cutting tool laterally.

9. A machine tool comprising a base, a sleeve journaled on said base to turn about a predetermined axis, a shaft disposed within said sleeve and journaled on the sleeve to turn bodily therewith and to turn relative to the sleeve about a second axis parallel to but laterally spaced from said first axis, said shaft projecting beyond one end of said sleeve and adapted to support a laterally projecting cutting tool, individual drive mechanisms for said sleeve and said shaft operable to turn the two in unison about their respective axes, at least one of said mechanisms including two helical gears meshing with each other and supported for relative axial shifting, and means operable selectively to shift said gears relative to each other thereby to turn said shaft relative to said sleeve and shift said tool laterally.

10. A machine tool comprising a base, a sleeve journaled on said base to turn about a predetermined axis, a shaft disposed within said sleeve and journaled on the sleeve to turn bodily therewith and to turn relative to the sleeve about a second axis parallel to but laterally spaced from said first axis, said shaft projecting beyond one end of said sleeve, a laterally projecting cutting tool mounted on the projecting end of said shaft, individual drive mechanisms for said sleeve and said shaft operable to turn the two in unison about their respective axes, said drive mechanisms being positioned externally of said sleeve and shaft, at least one of said drive mechanisms including two helical gears meshing with each other and supported for relative axial shifting, and means operable selectively to shift said gears relative to each other thereby to turn said shaft and cutting tool relative to said sleeve and shift said cutting tool laterally.

11. A machine tool having, in combination, a base, a support mounted on said base to turn about a first predetermined axis, a member adapted to carry a laterally projecting cutting tool and mounted on said support to turn bodily therewith about said first axis and to turn relative to the support about a second axis parallel to but laterally spaced from said first axis, a drive mechanism operable to turn said support about said first axis, a second drive mechanism operable to turn said member about said second axis in unison with the turning of said support, at least one of said mechanisms including two helical gears meshing with each other and mounted for relative axial shifting, and selectively operable means for shifting said gears relative to each other thereby to turn said member relative to said support and shift said tool laterally.

12. A machine tool having, in combination, a base, a support mounted on said base to turn about a first predetermined axis, a member mounted on said support to turn bodily therewith about said first axis and to turn relative to the support about a second axis parallel to but laterally spaced from said first axis, a cutting tool mounted on said member projecting laterally of said first and second parallel axes, a drive mechanism operable to turn said support about said first axis, a second drive mechanism external of said support and shaft and operable to turn said member and cutting tool about said second axis in unison with the turning of said support, at least one of said mechanisms including two helical gears meshing with each other and mounted for relative axial shifting, and selectively operable means for shifting said gears relative to each other thereby to turn said member and cutting tool relative to said support and shift said cutting tool laterally.

13. A machine tool having, in combination, a base, a first member journaled on said base to turn about a first predetermined axis, a second member adapted to support a cutting tool and mounted on said first member to turn bodily therewith and to turn relative to said first member about a second axis parallel to and laterally spaced from said first axis, mechanism connected to said members and normally operable to turn the two members at the same angular speed about their respective axes, said mechanism including two meshing helical gears in the connection to one of said members, and means for shifting said gears axially relative to each other to change the angular speed of said one member during said shifting thereby to vary the relative angular positions of said members and project said tool laterally different distances.

14. A machine tool having, in combination, a base, a first member journaled on said base to turn about a first predetermined axis, a second member mounted on said first member to turn bodily therewith and to turn relative to said first member about a second axis parallel to and laterally spaced from said first axis, a cutting tool mounted on said second member and projecting laterally thereof; mechanism connected to said members and normally operable to turn the two members at the same angular speed about their respective axes, said mechanism including two meshing helical gears in the connection to one of said members, and means for shifting said gears axially relative to each other to change the angular speed of said one member during such shifting thereby to vary the relative angular positions of said members and project said cutting tool laterally different distances.

References Cited in the file of this patent

UNITED STATES PATENTS 2,303,300    Hibbard _____ Nov. 24, 1942

FOREIGN PATENTS 993,914    France _____ Aug. 3, 1951